United States Patent [19]

Siddon et al.

[11] Patent Number: 4,775,521

[45] Date of Patent: Oct. 4, 1988

[54] PROCESS FOR THE PRODUCTION OF FERROUS SULPHIDE

[75] Inventors: John Siddon, Warrington; Derek Mellor, Widnes; Nigel Draper, Liverpool, all of England

[73] Assignee: Laporte Industries Limited, London, England

[21] Appl. No.: 71,853

[22] Filed: Jul. 10, 1987

[30] Foreign Application Priority Data

Jul. 30, 1986 [GB] United Kingdom ............... 8618598

[51] Int. Cl.$^4$ ............................................. C01G 49/12
[52] U.S. Cl. ................................. 423/561 R; 75/10.15; 75/10.16; 75/10.63; 75/10.66; 75/23; 75/30
[58] Field of Search ............................. 423/561 R, 565; 75/10.16, 10.15, 23, 24, 30, 51.1, 10.63, 10.66

[56] References Cited

U.S. PATENT DOCUMENTS 1,169,093  1/1916  Petinot ........................... 423/561 R
1,487,275  3/1924  Scharschu ....................... 75/10.16
4,032,327  6/1977  Donaldson et al. ................ 75/24

OTHER PUBLICATIONS

Van Nostrand's Scientific Encyclopedia, 4th Ed., "Electric Furnace", p. 582.

Primary Examiner—John Doll
Assistant Examiner—Jeffrey Edwin Russel
Attorney, Agent, or Firm—Kane, Dalsimer, Sullivan, Kurucz, Levy, Eisele and Richard

[57] ABSTRACT

Ferrous sulphide is produced by forming a melt of a source of sulphur, suitably flotation grade iron pyrites, and a source of iron, suitably steel, in an electric induction furnace until reaction has ocurred, allowing a slag to form and removing the slag and pouring the residual ferrous sulphide product. Precautions are taken to protect the furnace circuitry from the pervasive effect of iron pyrites dust. The process may produce a ferrous sulphide product containing up to about 35% sulphur by weight with only low sulphur emission to the atmosphere.

6 Claims, No Drawings

PROCESS FOR THE PRODUCTION OF FERROUS SULPHIDE

BACKGROUND OF THE INVENTION

1. Field of the Invention

This invention relates to the pyrometallurgical production of ferrous sulphide.

2. Brief Description of the Prior Art

Ferrous sulphide has long been produced by charging a furnace with a suitable source of sulphur, which might be sulphur itself or an iron disulphide such as iron pyrites, and a suitable source of metallic iron, forming a molten reaction mixture of the source of sulphur and the source of metallic iron by operation of the furnace, allowing reaction between the sulphur or the iron disulphide and the metallic iron in the reaction mixture to occur, tapping the furnace of the resulting molten ferrous sulphide product and subsequently disposing of unwanted slag produced.

Furnaces directly heated by the combustion of a fuel, such as fuel oil, were originally used and are still being used in processes as above described for the production of ferrous sulphide despite disadvantages associated with this type of furnace. Residual oxygen present in the combustion gases, as well as oxygen or oxides present in the furnace charge, react with the sulphur content of the raw materials to an appreciable extent to form sulphur dioxide the allowed emission levels of which are strictly controlled by regulation in most industrial countries. The necessity of controlling sulphur dioxide emissions has led to need to scrub the stack gases emitted from conventional direct-fired ferrous sulphide production furnaces and even when the sulphur values so removed are recovered in usable form this does not represent an economic utilisation of the sulphur. A further consequence of the presence of oxygen in the furnace combustion gases may be the formation of ferrous oxide the presence of which, as noted in British Patent Specification No. 1281284, can cause wear of alumina or silica furnace linings. Although at low residual oxygen concentrations this effect may not be marked it nevertheless represents a potential contributory factor to furnace lining wear.

As long ago as the year 1916 the problems associated with the use of direct-fired furnaces in the production of ferrous sulphide were described in U.S. patent specification No. 1169093 and a method of avoiding them proposed. According to that method the source of sulphur to be used was an iron pyrites containing sufficient siliceous impurities to form a slag blanket over the melt. The effect of the slag was to reduce losses of sulphur, presumably in the form of sulphur dioxide formed by reaction with oxygen or oxides present in the furnace charge, from the melt surface. The furnace to be used was an electric furnace of the arc type. The rapid melting of the charge in such a furnace caused the immediate formation of slag so that it could be maintained as a protective blanket from the inception to the end of the process. If an iron pyrites containing sufficient impurities to attain a slag blanket having the required thickness was unavailable the deficiency could, to a degree, be supplied by the addition of sand or other slag-forming substances to the charge. However the need to use low grade iron pyrites as a raw material decreases cost efficiency per unit of ferrous sulphide product due to the greater quantity of raw material to be heated.

SUMMARY OF THE INVENTION

A new or improved process for the production of ferrous sulphide is now provided comprising forming a melt comprising a mixture of a source of sulphur and a source of metallic iron in a furnace, allowing reaction between the source of sulphur and the metallic iron to form ferrous sulphide to occur in the melt and a slag layer to form, removing the slag layer and recovering a molten ferrous sulphide product the process being characterised in that the furnace is an electric induction furnace. The operation of the electric induction furnace results in a very high degree of agitation of the melt so that a slag layer is unable to form. From the teaching of the U.S. patent specification referred to above, according to which a slag blanket plays an important role, it might be assumed that this feature would render an induction furnace unsuitable for use for the production of ferrous sulphide. The Applicants have now found, to the contrary new and unexpected benefits flow from the use of an induction furnace namely an unexpectedly low emission of sulphur dioxide from the furnace and the ability to use a relatively pure source of sulphur, for example flotation grade iron pyrites without the need to add slag-forming substances.

DETAILED DESCRIPTION OF THE PREFERRED EMBODIMENTS OF THE INVENTION

Iron pyrites, particularly the finely divided form typical of the flotation grade material, which is preferred according to this invention, is a difficult-to-process material. It does not melt on its own but only in solution. Further, the powder is electrically conductive and slightly magnetic, is particularly invasive of electrical equipment because of the latter property and is prone to cause shorts in electrical circuitry. Such a material is apparently quite unsuited for processing in an electric induction furnace because of the high current densities in use and because of the necessity to maintain a highly mobile fluid mass in such a furnace. Nevertheless, it has been found that iron pyrites may be successfully processed in such a furnace, particularly if certain operational and constructional features are utilised.

Due to the particular character of iron pyrites it cannot of itself be heated by electric induction means. An important concept of the present invention is to utilise the charge of metallic iron to accomplish the required degree of heat generation while introducing the iron pyrites, or other source of sulphur, in such a manner as to avoid undue dilution of the iron and a consequent undue temperature drop, and to control the said addition so that the temperature profile of the furnace with time is satisfactory.

Preferably, according to the invention: at least a proportion and particularly preferably a major proportion of the source of metallic iron is introduced into the furnace and melted therein and the iron pyrites or other source of sulphur is introduced into the iron melt. As it is added the iron pyrites or other source of sulphur readily enters into solution in the melt and enables temperature control to be achieved as hereafter described in more detail.

Due to the pervasive nature of iron pyrites the atmosphere surrounding the electrical circuitry of the furnace is preferably kept free, or substantially free, of iron pyrites dust. This may be achieved by physically isolating the portion of the furnace incorporating the coils and associated circuitry within a building, or otherwise providing a shielding structure, which when the furnace is in its operational position, is sealed against the intrusion of pyrites dust. Suitable means to remove dust from the air within this building or structure may also be provided. It may be necessary to expose the interior of the building or structure when the furnace is in the pouring position but at this time the iron pyrites feed mechanism is not operating and the general air filtration system may have reduced the quantity of dust present to acceptable levels.

The furnace is preferably operated at a relatively low frequency as hereafter described. It is found that under such conditions the reaction mixture is maintained homogeneous with no slag formation and with relatively little tendency for the iron pyrites to form a separate unmelted phase. If it appears that the iron pyrites is showing a tendency to bridge the mouth of the furnace this may be prevented by the use of a poker or similar implement.

The low emission of sulphur dioxide associated with the present process may be due to enhanced reaction efficiency due to the agitation of the furnace change which rapidly mixes in charge additions which are made during the course of the process. It is understood that the initial furnace charge and subsequent additions, e.g. of iron pyrites, reduce in volume on melting so that a regime of continuous or intermittent charge augmentation is necessary to achieve a full furnace charge of ferrous sulphide product. The presence of slag forming constituents maintained in admixture with the remainder of the reactants during the formation of the ferrous sulphide may also have an effect on the impurity level of the ferrous sulphide product.

The manner of putting the invention into effect will now be more specifically described.

The source of sulphur may be iron pyrites, preferably a high grade pyrites, such as flotation pyrites, having a content of $FeS_2$ of from about 85% to 98% by weight and a content of silica and other slag forming impurities of below 10% preferably below 5% by weight, or other suitable source of sulphur. It is understood that hereafter, unless the context requires otherwise, reference to iron pyrites include references to suitable alternative sources of sulphur. The iron pyrites is preferably dried and, for example, contains less than 0.5% by weight of water particularly preferably less than 0.2% by weight of water.

The source of metallic iron material may be scrap iron or steel in any suitable physical form, for example, in the form of plate scrap, borings or turnings. Steel may be preferred because of its low content of oxides and of carbon. The raw materials are preferably used in such proportions, calculated after removal of the slag-forming constituents as to give a product containing from about 25% to 35% by weight sulphur.

The quantity of iron pyrites used in relation to the quantity of metallic iron is suitably controlled to give a product having a desired ferrous sulphide content. If a product having a high sulphur content is required it may be necessary to use even more than the stoichiometric quantity of pyrites for example up to 10% excess over the stoichiometric quantity to compensate for some loss of pyrites in the slag. If it is desired to produce a product having a relatively low sulphur content as little as 50% of the stoichiometric quantity of iron pyrites may be used. For many commercial products it will be preferred to use from about 60% to about 95% of the stoichiometric quantity of iron pyrites.

The furnace is preferably lined in the usual way, preferably using a silica or alumina powder or a suitable alternative tamped into place behind a steel former which later becomes part of the furnace charge. Preferably one or more transition metal oxides or oxide-forming compounds, for example chromium or zirconium oxide, or boric oxide or a boric oxide forming compound is added to the silica or alumina powder in a minor quantity, for example from 0.2% to less than 5% wt, to improve the durability of the lining in use according to the invention. The furnace is then filled with the source of iron and is heated progressively, e.g. over 10-15 hours up to 1550° C. to frit the powder. The invention may then be put into effect by adding iron pyrites to the resulting iron melt. Preferably the addition of the iron pyrites is controlled in relation to the power input to the furnace to allow the temperature in the furnace to cool during the addition, while maintaining agitation of the furnace charge, towards the eutectic temperature of 1093° C. The temperatre at the end of the iron pyrites addition, which coincides with substantial reaction completion, is preferably within about 200° C., particularly preferably within about 100° C. of the eutectic temperature. The rate at which this temperature decrease is achieved is dependent on the rate at which the iron pyrites may be added to the furnace charge without bridging.

The frequency at which the electrical induction furnace is run is preferably maintained at a lower than normal level. Such furnaces are often run at a frequency of just below 1000 Hertz. However, according to the invention the frequency is preferably maintained at below 600 Hertz, particularly preferably at between 150 and 350 Hertz for example very suitably at a frequency of between 200 to 300 Hertz during the addition of the iron pyrites. The matter of frequency selection is an important feature of this invention since the frequency affects the degree of agitation of the furnace charge subject to a sufficiently high frequency being maintained to attain the desired heating effect. Preferaly the degree of agitation is such as to prevent the formation of any substantial slag blanket during the introduction of the iron pyrites.

After the desired quantity of pyrites has been added to the furnace, the furnace is turned off or reduced in power sufficiently to allow a slag to form. The slag is removed and the remaining charge, consisting mainly of molten ferrous sulphide, together with some residual impurities and possibly, residual iron, may be poured or tapped into moulds. The next cycle may then be commenced by introducing a further charge of the source of iron into the furnace, melting it by the operation of the furnace and as it melts or after it has melted adding the pyrites in the manner above described. The melt temperatures are also suitably maintained as indicated above to be appropriate or preferred during the addition of the pyrites and the slag forming and removal steps and the product tapping step of the first cycle repeated.

The process may be operated cyclically in the above indicated manner without replacing the lining for a large number of cycles, for example for up to about 50 cycles where the furnace lining is silica after which the lining requires to be reformed.

Due to the need to add pyrites continuously or intermittently the furnace is desirably operated with an open top. It is found that the emissions from the furnace are so low, provided the process is controlled as above taught, that this may be accomplished with normal fume extraction for operator protection. For example the maximum emission from production runs in an electric induction furnace varied between 20 and 40 Kg/hr S with a batch average emission of 8–15 Kg/hr S. The corresponding figures for a direct oil-fired furnace containing a similar charge weight were a maximum emission range of 50–120 Kg/hr S and a batch average emission of 18.3 Kg/hr S. In a particular production run using pyrites; containing 51% sulphur, 46% iron and 4% water which was dried to below 0.1% water content; and steel the peak emission was 35.2 Kg/hr S with a batch average of 12 Kg/hr S and the product contained 85% wt FeS equivalent to 31% wt on a sulphur basis. The product contained less than 50 parts per million by weight calculated as the metal, of lead.

The reduction in the proportion of sulphur dioxide in the emissions made possible by the invention make direct emission discharge possible. Dust, for example from the pyrites, may be removed from the air by normal dust entrapment means.

What is claimed is:

1. A process for the production of ferrous sulphide from a source of metallic iron and iron pyrites, which comprises; introducing at least a major proportion of the source of metallic iron into a electric induction furnace; melting the metallic iron by the operation of the furnace; progressively introducing into the molten metallic iron charge in the furnace from 50% to 110% of the stoichiometric quantity of iron pyrites and while controlling the operation of the furnace at a frequency of 150 to 600 Hertz; thereby preventing the formation of a slag layer in the furnace until the addition of the iron pyrites and has been completed and while maintaining the charge in the molten form; thereafter allowing a slag layer to form; removing the slay layer; and recovering the ferrous sulphide product from the furnace.

2. A process as claimed in claim 1 wherein the temperature in the furnace is allowed to fall to within 200° C. of the eutectic temperature of the melt during the introduction of the source of sulphur.

3. A process as claimed in claim 1 wherein the furnace is operated at a frequency of from 150 to 350 Hertz during the introduction of the source of sulphur.

4. A process as claimed in claim 1 wherein the furnace has a lining of silica containing up to 5% by weight of one or more transition metal oxides or boric oxide.

5. A process as claimed in claim 1 wherein the source of metallic iron is steel or iron scrap.

6. A process as claimed in claim 1 wherein the proportions of the source of sulphur and of the source of metallic iron are such as to give a product containing from 25% to 35% by weight of ferrous sulphide calculated as sulphur.

* * * * *